US012364957B2

(12) United States Patent
Mansour et al.

(10) Patent No.: US 12,364,957 B2
(45) Date of Patent: Jul. 22, 2025

(54) MIXING DEVICE WITH REVERSED COILED CONFIGURATION AND USE THEREOF

(71) Applicant: OTTO-VON-GUERICKE-UNIVERSITAT MAGDEBURG, Magdeburg (DE)

(72) Inventors: Michael Mansour, Magdeburg (DE); Dominique Thevenin, Magdeburg (DE)

(73) Assignee: OTTO-VON-GUERICKE-UNIVERSITAT MAGDEBURG, Magdeburg (DE)

( * ) Notice: Subject to any disclaimer, the term of this patent is extended or adjusted under 35 U.S.C. 154(b) by 772 days.

(21) Appl. No.: 17/613,480

(22) PCT Filed: May 20, 2020

(86) PCT No.: PCT/EP2020/064058
§ 371 (c)(1),
(2) Date: Nov. 22, 2021

(87) PCT Pub. No.: WO2020/239570
PCT Pub. Date: Dec. 3, 2020

(65) Prior Publication Data

US 2022/0241740 A1 Aug. 4, 2022

(30) Foreign Application Priority Data

May 24, 2019 (EP) .................................... 19176360

(51) Int. Cl.
*B01F 25/00* (2022.01)
*B01F 25/433* (2022.01)

(52) U.S. Cl.
CPC ................................ *B01F 25/4331* (2022.01)

(58) Field of Classification Search
CPC .................................................. B01F 25/4331
See application file for complete search history.

(56) References Cited

U.S. PATENT DOCUMENTS

| | | | | |
|---|---|---|---|---|
| 7,337,835 | B2 | 3/2008 | Nigam | |
| 2004/0252584 | A1* | 12/2004 | Ji ........................ | B01F 25/4331 366/338 |
| 2019/0282976 | A1* | 9/2019 | Pukkella ............. | B01F 25/4331 |

FOREIGN PATENT DOCUMENTS

| | | | |
|---|---|---|---|
| EP | 0045558 | A1 | 6/1981 |
| EP | 3741453 | A1 | 11/2020 |
| WO | 2004046694 | A1 | 6/2004 |
| WO | 2011059113 | A1 | 5/2011 |
| WO | 2020239570 | A1 | 12/2020 |

OTHER PUBLICATIONS

European Search Report—Application/Patent No. 19176360.6-1019, Applicant Otto-von-Guericke-—Universitat Magdeburg Dec. 2, 2019.

(Continued)

*Primary Examiner* — Anshu Bhatia
(74) *Attorney, Agent, or Firm* — Hinckley Allen & Snyder; Stephen Holmes

(57) ABSTRACT

The present invention relates to a tubular mixing device (6) with reversed coiled configuration (also referred to as "coiled flow reverser" CFR)) wherein after a number n of turns (2) with n=1; 2 the flow path is reverted to the opposite direction, and wherein the device (6) has an overall straight coil axis.

17 Claims, 5 Drawing Sheets

(56) References Cited

OTHER PUBLICATIONS

Figure 1:
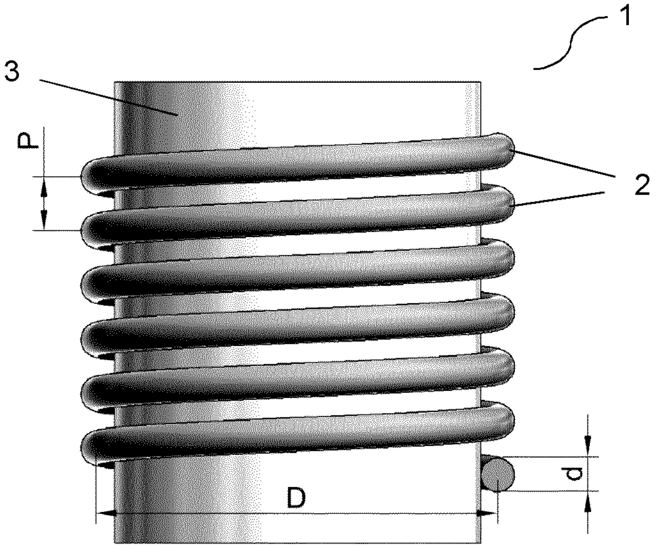

Notification of Transmittal of the International Search Report and Written Opinion—PCT/EP2020/064058, Applicant Otto-von-Guericke—Universitat Magdeburg Sep. 8, 2020.
Jiang, F. et al., "Helical Flows and Chaotic Mixing in Curved Micro Channels", AlChE Journal (20040000), vol. 50, No. 9, pp. 2297-2305.
Dong, L. and Shufen, Z., "Numerical and Experimental Investigation of the Effect of Geometrical Parameters on the Performance of a Contraction-Expansion Helical Mixer," Int. Journal of Chem. Reactor Engineering (2014000), vol. 12, No. 1, pp. 465-475.
Asbet, Y. et al., "Thermal and Hydrodynamic Performances of Chaotic Mini-Channel: Application to the Fuel Cell Cooling", Heat Transfer Engineering (20070000), vol. 28, No. 8-9, pp. 795-803.
Alam, A. et al., "Analysis of mixing in a curved microchannel with rectangular grooves," Chem. Engineering Journal, (20120000), vol. 181, pp. 708-716.
Mansour, M. et al., "Numerical study of liquid-liquid mixing in helical pipes," Chem. Eng. Science, (20170000) vol. 172, doi: 10.1016/j.ces.2017.06.015, pp. 250-261.
Mansour, M., et al., "Numerical study of heat transfer and thermal homogenization in a helical reactor," Chem. Eng. Si.,(20180000), vol. 177, pp. 369-379.

* cited by examiner (a) 6-turn configurations (b) 3-turn configurations

MIXING DEVICE WITH REVERSED COILED CONFIGURATION AND USE THEREOF

The present invention relates to a tubular mixing device with reversed coiled configurations.

Flow mixing is very important for numerous industrial processes and applications, including chemical industry, pharmaceutical industry, paper industry, food processing, waste water treatment, and heat and mass transfer applications.

In laminar flow through a tube, a parabolic velocity profile is established over the cross-section with maximum velocity in the center of the flow and a velocity of 0 at the walls due to adhesion, which results in a very broad residence time distribution over the cross-section along with poor mixing. When a fluid flows through a helically coiled pipe, centrifugal force acts on the fluid. The centrifugal force induces secondary flows (known as Dean vortices) which leads to improved mixing efficiency. There are known different types of helical configurations of mixers in order to enhance mixing.

Helical pipes offer very efficient mixing even in the laminar regime with low pressure drop and minimal maintenance, i. e. without moving parts, compared to the use of active mixers such as stirrers, etc. The presence of secondary flows in such helical pipes can strongly enhance radial mixing and provide narrower residence time distributions over the profile cross-section.

U.S. Pat. No. 7,337,835 B2 to Nigam relates to a heat exchanger for transferring heat from one fluid to another fluid with a coiled configuration referred as “coiled-flow-inverter” (CFI). This configuration is based on the principle of flow inversion by successive bending of helical coils, so that the direction of the centrifugal force (secondary flow) can be regularly inverted resulting in improved radial mixing compared to a straight coil. The CFI comprises four discrete helically coiled tubes, each coiled tube having at least four turns, wherein the axis of each helical coil is bent at an angle of 90° with respect to the axis of the adjacent helical coil. The use of several bends at a right angle causes multiple flow inversion of the fluid, resulting in enhanced heat transfer, narrowing of residence time distribution along with good radial mixing.

WO 2004/046694 A1 relates to a mixing tube built-in a particle analyzer, wherein the mixing tube runs along a longitudinal axis L describing a meandering fluid path. There are at least a radial turn with the fluid turning radially around axis L, and a plurality of axial turns with the fluid path being changed by 90° bending or 180° bending. In total, numerous flow path modifications are made by the tube of D1 resulting in a very complex path which undergoes multiple different mixing turns. Though providing good fluid mixing such a complex unstructured fluid path with multiple and different three-dimensional mixing turns leads inevitably to a significant increase in pressure drop and, consequently, operation cost.

A plurality of different helical structures and geometrical modifications were developed to improve mixing, such as pipes with rectangular or non-circular cross-sections (Ref. 1), contraction-expansion pipes (Ref. 2), strongly modified flow paths (Ref. 3), and combination of complex, chaotic structures such as the CFI referred to above or (Ref. 4).

However, in helical and coiled-flow inverters flow mixing and heat transfer decrease generally with the increase of flow velocity expressed as Reynolds number (Re), due to the reduction of the residence time of the fluids within the mixing device. Further, the efficiency of flow mixing in helical pipes was found to be strongly dependent on the initial orientation of the liquids interface with respect to the coil axis at the inlet surface of the pipe. Moreover, the performance of a CFI with only a few inversions was found to be very close to the simple straight helical pipe. Finally, in most cases, a significant enhancement of flow mixing was only possible with a high number of flow inversions and/or by strong modifications of the geometry, increasing considerably production cost and complexity. Additionally, a significant increase in pressure drop was observed, which might not be suitable for many practical applications and results in larger pumping requirements and operating costs.

Thus, it was the object of the present invention to provide a mixing device with coiled configuration providing improved flow mixing along with only low or economically acceptable pressure drop, efficient heat transfer, and having a simple and structured design without the need for cost intensive complex structures and inserts.

This object is achieved by a mixing device with a helical structure wherein the coiling direction is reversed after each single turn or each second turn and wherein very low flow modifications can provide excellent mixing with only negligible pressure drop.

Reversal of coiling direction means a change of flow path to the opposite direction with respect to the direction of the flow path in the preceding turn. That is, in the helical mixing device of the present invention, the coiling direction is reversed after a number of n windings with n=1; 2.

Preferably n=1.

By reversal of the coiling direction after each single or at most second turn formation of a fully-developed flow is prevented and the flow is maintained in the developing more disturbed condition. It was observed by the present inventors that flow mixing and thermal homogenization in helical pipes are significantly higher and faster in the entrance region (typically the first two coil turns) rather than in the fully-developed flow region. Consequently, according to the present invention, a helical mixing device is provided having many developing regions with consecutive locations of high mixing rate.

In the “coiled flow reverser” (CFR) of the present invention, the flow is continuously redirected in a structured and compact way, thereby avoiding high operation and production costs of other geometries like chaotic ones. In the CFR the coiling direction is rapidly and completely reversed, creating a more complex secondary flow, and enhancing significantly mixing and heat transfer. Moreover, even at high Reynolds number, such as Re=3000, despite the strongly reduced residence time associated therewith, excellent flow mixing can be obtained with a slight increase of pressure drop of a maximum of only up to 9% higher than that in straight helical coils.

With the mixing device of the present invention almost perfect mixing can be obtained using not more than 2 reversals of the flow path. Thus, further modifications in the flow path can be avoided which would lead to increased pressure drop and operational cost with no profit in flow mixing.

Apart from improved mixing efficiency also a significant improvement in heat transfer is observed. For example, as the Reynolds number increases heat transfer is continuously enhanced compared to the straight helical coil, with 5% increase in the outlet temperature at Re=3000 even in a short CFR with only three turns, corresponding to two reversals.

An important parameter having a strong influence on mixing efficiency of a curved or coiled mixer design is the orientation of the fluids interface with respect to the coil axis at the inlet surface of the mixing device. For example, in a conventional straight helical coil a parallel orientation of the fluids interface with respect to the coil axis at the inlet surface provides the best mixing efficiency whereas the worst mixing efficiency is obtained with the other extreme case, the perpendicular orientation (see FIG. 4, left and right, respectively). These two cases correspond to the limit cases of best and poorest mixing in a straight helical coil. The reason is, in a straight helical coil the mixing efficiency is significantly higher when the generated secondary vortices are optimally perpendicular to the inlet surface as is the case with the parallel orientation of the fluids interface with respect to the coil axis (see FIG. 4, left). On the contrary, the mixing efficiency of the present CFR does not show such a strong dependency on the orientation of the fluids interface at the inlet surface. In particular, for high Re-numbers such as Re≥500 improved flow mixing is achieved with the CFR. Even for Re as high as 3000, the mixing efficiency in the present CFR is still very close to 100% despite the strongly reduced residence time.

That is, with the present CFR, a wide range of orientation of the fluids interface with respect to the coil axis at the inlet surface is feasible without particular impairment of performance in terms of mixing efficiency and pressure drop even at high Re-numbers.

However, in view of the optimal alignment of the developing Dean vortices, a parallel or near parallel orientation is preferred.

Figure 3:
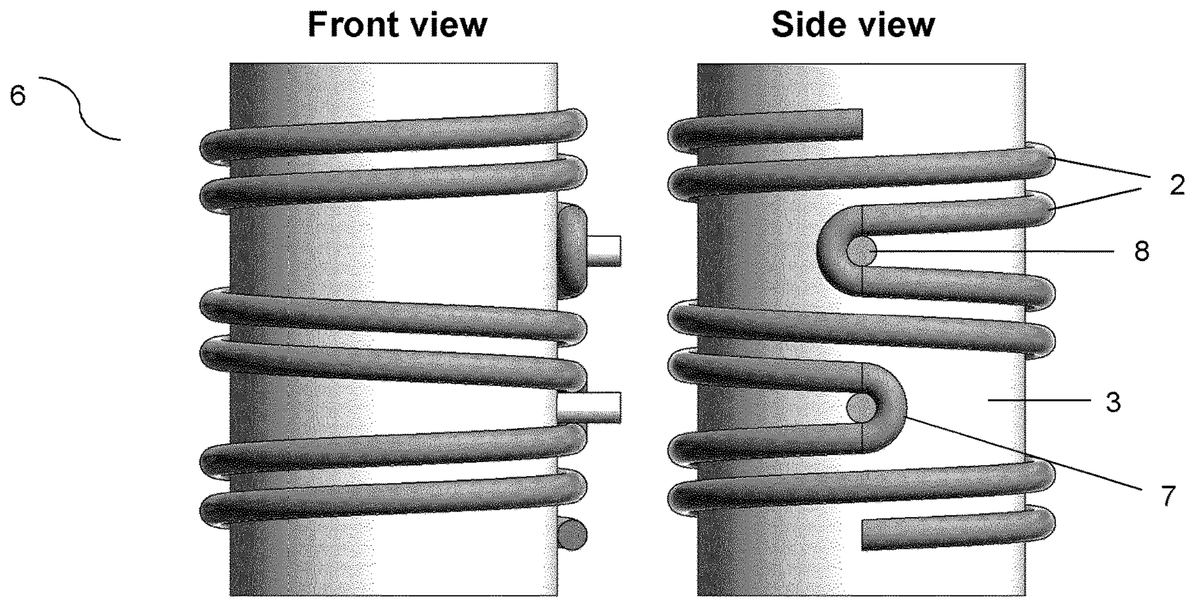
Figure 4:
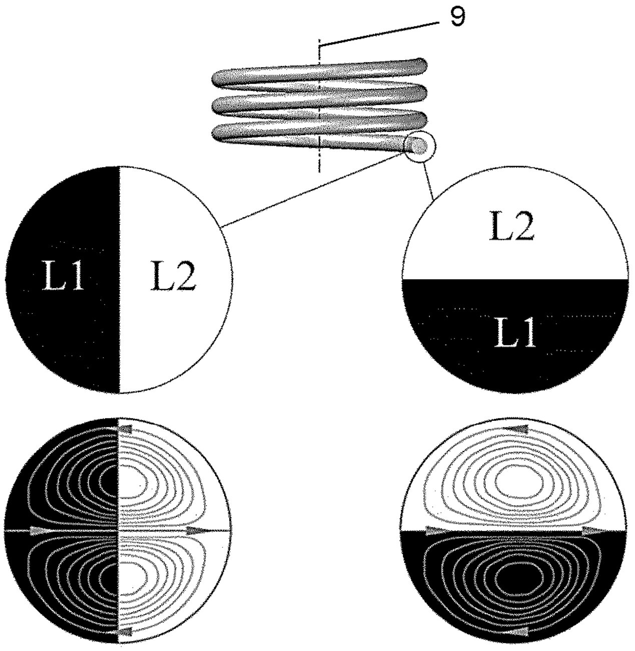

In the following the present invention is explained in more detail with reference to the accompanying figures, wherein is shown in FIG. 1 a front view of a prior art conventional straight helical coil, FIG. 2 a front view of a coiled flow inverter (CFI), FIG. 3 a front and side view of an exemplary embodiment of the coiled-flow reverser (CFR) of the present invention, FIG. 4 schematically the two extreme cases with parallel and perpendicular orientations of the fluids interface with respect to the coil axis at the inlet surface together with the secondary flow lines, FIG. 5*a, b* a comparison of final mixing coefficient at the outlet surface as a function of Re for (a) 6-turn configurations and (b) 3-turn configurations with parallel initial interface (i) and perpendicular initial interface (ii), FIG. 6*a, b* a comparison of surface-averaged outlet temperature as a function of Re (left), and the relative increase in temperature compared to a straight coil (right) for (a) 6-turn configurations and (b) 3-turn configurations with (i) surface-averaged outlet temperature and (ii) percent increase in temperature, and FIG. 7 a comparison of pressure drop per unit length as a function of Re for (a) 6-turn configurations and (b) 3-turn configurations.

FIG. 1 shows a conventional straight helical coil 1 with 6 turns 2 coiled around a cylindrical carrier member 3, with coil pitch p, pipe diameter d and coil diameter D.

Figure 2:
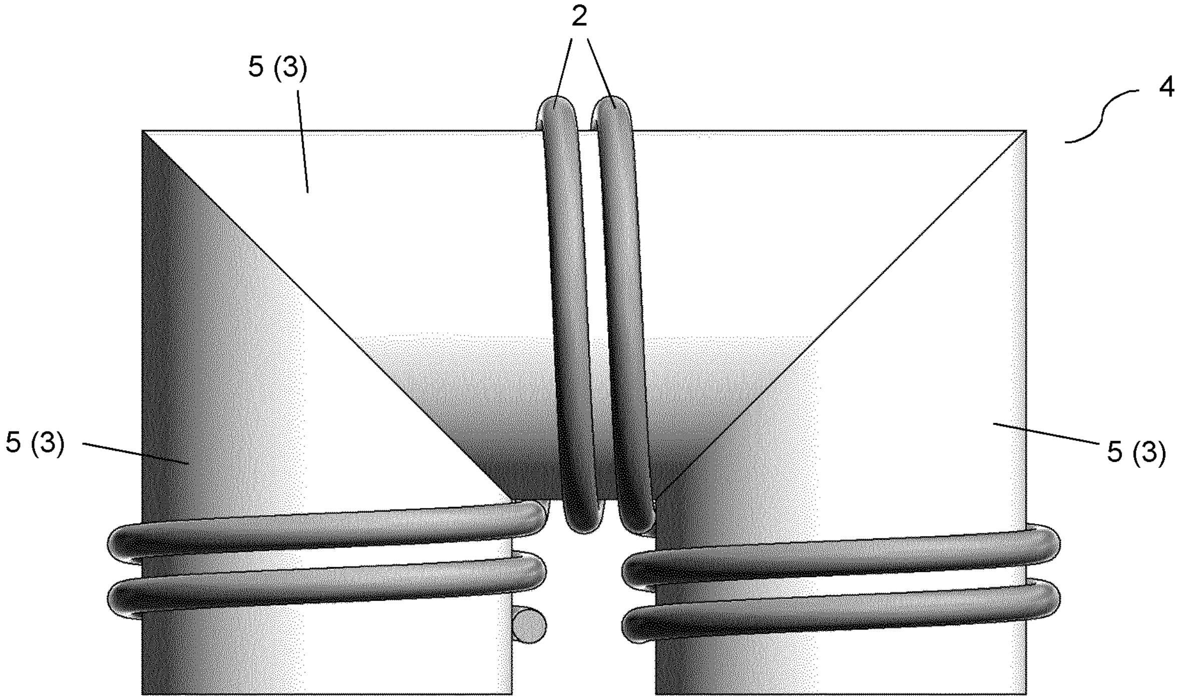

The known coiled-flow inverter (CFI) 4 with an overall of 6 turns 2 with two turns per arm 5 is shown in FIG. 2.

The CFI is coiled around a cylindrical carrier member 3 composed of 3 arms 5 with two 90° bends with respect to the coil axis.

After each two turns 2 the coil is bent at an angle of 90° with respect to the coil axis.

The configuration of the CFI of FIG. 2 is used in the following examples for a comparison with the performance of the present CFR having also 6 turns with a reversal of coiling direction after each second turn.

An exemplary embodiment of the coiled-flow reverser (CFR) 6 of the present invention with an overall of 6 turns 2 with a reversal of coiling direction (redirection point 7) after each second turn is shown in FIG. 3.

In the embodiment of FIG. 3, the coil of the CFR 6 is wound around a straight cylindrical carrier member 3.

For supporting redirection of the coil path at the point of redirection 7, redirection aids 8 can be provided around which the coiled tube is redirected to the opposite direction. The redirection aid 8 shown in FIG. 3 is a kind of lug projecting perpendicularly from the surface of the carrier member 3. The redirection aid 8 can have a cylindrical shape. Of course, any other shape can be also used which is helpful for redirecting the coiled pipe. In the embodiment shown in FIG. 3, the redirection aids 8 are positioned at regular distances along a line extending parallel to the coil axis of the CFR.

It becomes clear from the comparison of the CFR 6 shown in FIG. 3 and the known CFI 4 shown in FIG. 2, the present CFR has a straight coil axis without bendings contrary to the CFI. This straight coil axis offers the advantage of being easily coiled along a straight carrier member 3 in its core, like a standard straight coil rather than bending of the coil along its extension as is the case in the CFI 4.

The dimensions of the CFR can be selected according to need, such as overall path length, pipe diameter, coil diameter, number of reversals, etc. The present CFR is particularly suitable for flow mixing and heat transfer in the laminar flow regime with 10≤Re≤3000, in particular Re≥500.

The absolute pitch of the coil of the CFR in both directions is the same, with the pitch distance between two adjacent turns with the same flow direction being the same.

Any suitable design for a carrier member 3 can be used. As shown in FIG. 3, it can have a cylindrical shape, such as a solid rod or tube, the surface can be continuous or have openings, for example, a mesh.

The following investigations relate to liquids, but the present invention is likewise suitable for fluids in general, such as gases.

Investigations

For a comparison of the mixing efficiency in particular in terms of flow mixing versus pressure drop and heat transfer numerical investigations were conducted with the present coiled flow reverser, a conventional straight helical pipe mixer and the coiled flow inverter.

Apart from the coiling geometry coil parameter were identical such as the number of turns (3 turns and 6 turns, respectively), overall path lengths, coil pitch (P=16 mm), pipe diameter (d=10 mm) and coil diameter (D=118 mm).

Further, in order to evaluate the influence of inlet orientation a parallel and perpendicular inlet orientation of the initial interface of the liquids to be mixed were examined.

The coils were tested over a range of Reynolds number (Re) of 10 to 3000 corresponding to a Dean number range of 3 De 900.

Two identical miscible liquids (liquid 1, (L1) and liquid 2 (L2)) were used, having the physical properties of water (density p=998.2 kg/$m^3$, dynamic viscosity p=1.003 $10^{-3}$ Pa·s. To differentiate between the liquids L1 was marked with a numerical tracer.

For accomplishment and evaluation of the investigations, explicit reference is made to Ref. 5 and Ref. 6.

The mixing efficiency between the two liquids (also referred to mixing coefficient Mc) was determined, were Mc can vary from 0 to 1 with 0 indicating no mixing at all (0% mixing efficiency) and 1 indicating complete mixing (100% mixing efficiency).

As shown in FIG. 4 two different inlet configurations (parallel (left side) and perpendicular (right side)) were tested at the inlet surface. For this purpose, the inlet surface was split into two halves by a straight line, either parallel or perpendicular to the coil axis 9, each half being occupied by only one liquid. These two cases correspond to the limit cases of best and poorest mixing in a straight helical pipe.

The orientation of the streamlines of secondary flow (Dean vortices) with respect to the inlet surface is illustrated in the bottom figures.

Mixing Efficiency

Figure 5:
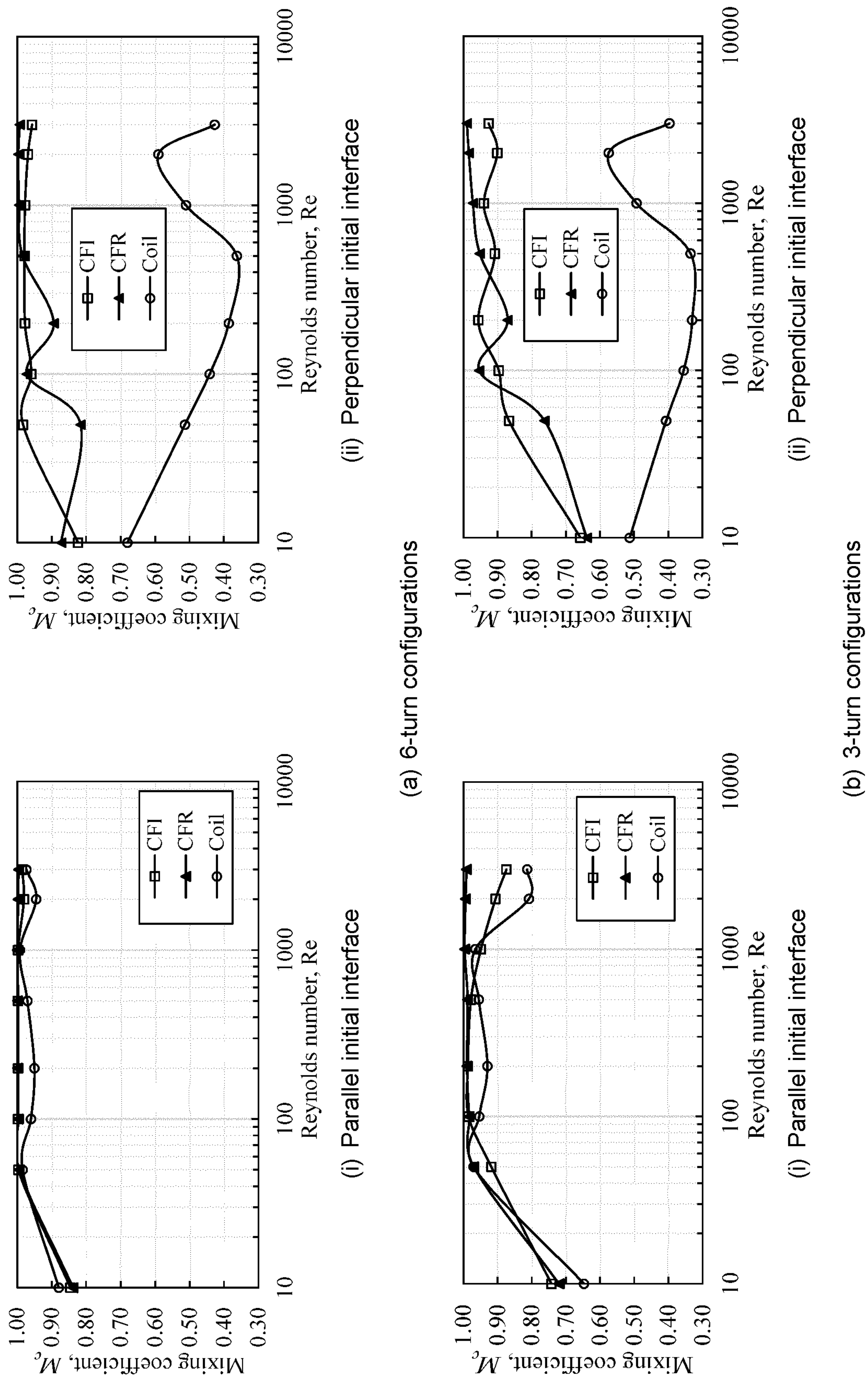

The final mixing coefficient obtained at the outlet of all configurations as a function of Re was compared. In FIG. 5, the final mixing coefficient of (a) the 6-turn and (b) the 3-turn configurations, considering (i) parallel and (ii) perpendicular initial interfaces is shown. As can be seen, the parallel interface led generally to a higher mixing coefficient. As mentioned above, the interface orientation has a severe influence on the mixing efficiency of the standard helical pipe while its influence is less pronounced for CFI and CFR. For the parallel interface (i), the present CFR produced a perfect mixing (Mc>0.99) for the whole range of Re 50. Even for the maximum Re=3000, the mixing coefficient of the CFR was not decreased in spite of the strong reduction of residence time.

It can be observed that the mixing coefficient of the CFI shows a smooth and stable behavior along the whole range of Re 50, independently from the initial interface. The mixing coefficient of the CFR shows stronger fluctuations, but becomes systemically better than CFI for Re 500; for this condition, excellent mixing was obtained by the CFR for all cases.

Comparison of Heat Transfer

The heat transfer performance and thermal homogenization of all three coiled configurations were compared.

The entering liquids were assumed to be close to room temperature (T=27° C.) at the inlet section. The working fluid was water, with a Prandtl number of $Pr=\mu c_p/k=6.7$, where $c_p$ is the specific heat, and k is the thermal conductivity. A constant-wall-temperature boundary condition was used for the walls with Tw=77° C. (initial temperature difference of 50° C.).

Figure 6:
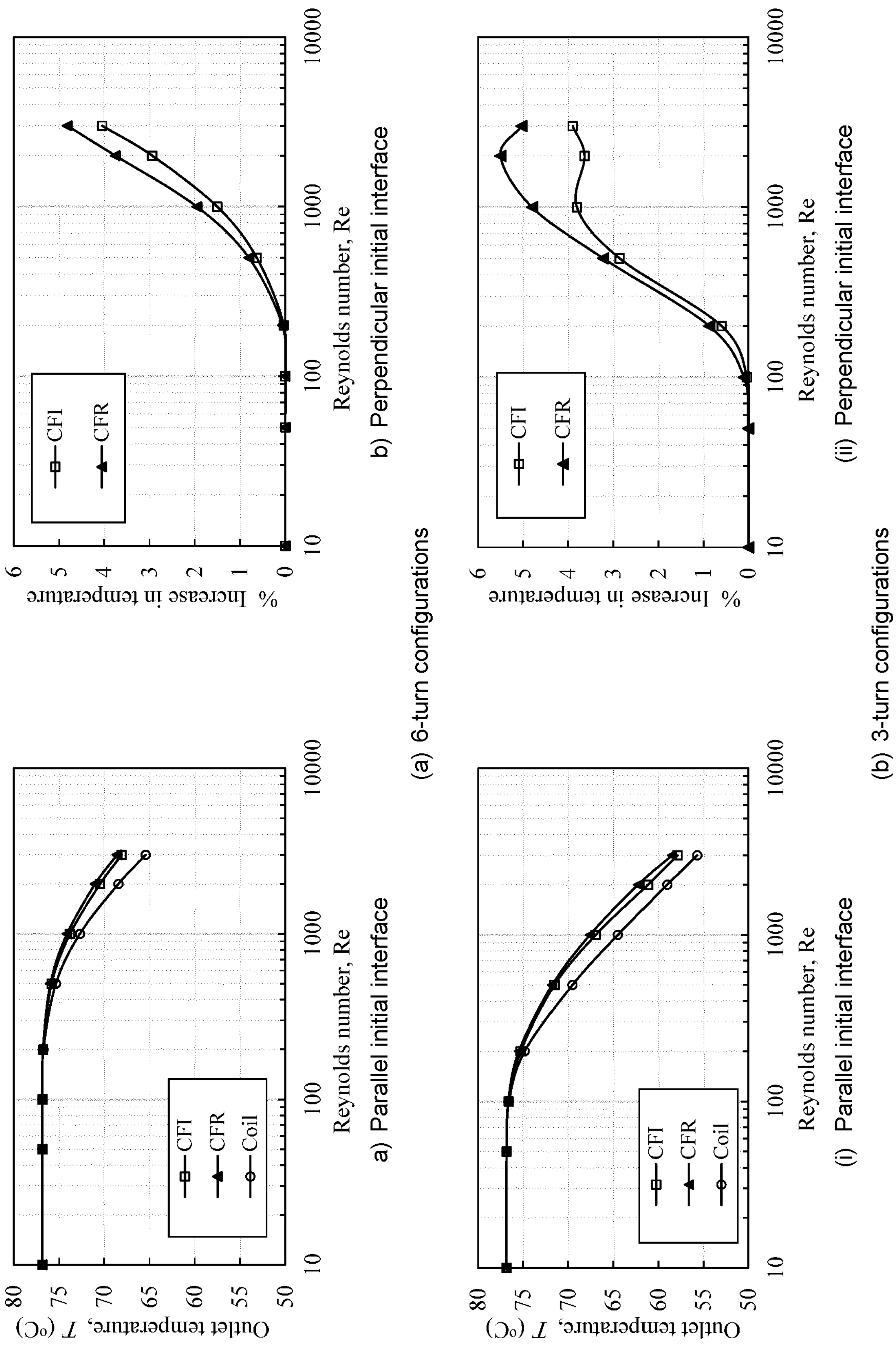

In FIGS. 6*a, b* the surface-averaged outlet temperature for all configuration was compared as a function of Re. As can be seen, the outlet temperature was constant and equal to the wall temperature for all geometries as long as Re≤100; in this case, perfect heat transfer was obtained due to the long residence time. However, for higher values of Re, i. e. shorter residence time, the CFI and the CFR showed better heat transfer and thermal homogenization in terms of higher averaged outlet temperatures. This effect was more pronounced in the 3-turn configurations (FIG. 6*b*), when re-directing the coil path after each turn in the CFI and the CFR.

FIGS. 6*a* (ii) and 6b (ii) show the percentage increase in outlet temperature of the CFI and CFR compared to that of the straight coil. In the CFI and the CFR, the heat transfer enhancement compared to the standard straight coil was continuously increasing for increasing Re. In all cases, the present CFR showed the highest surface-averaged outlet temperature and, thus, the best heat transfer and thermal homogenization. For example, compared to a straight helical coil at Re≥2000 an increase in outlet temperature exceeding 5% was observed in the CFR.

Pressure Drop

Figure 7:
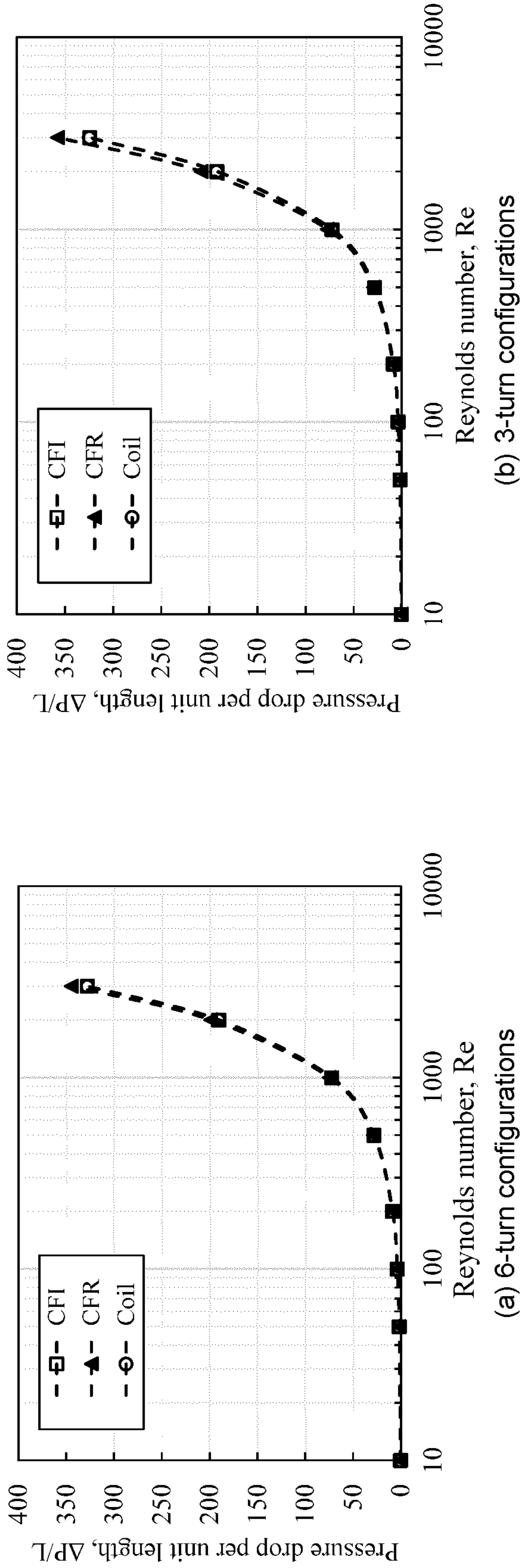

In FIG. 7, the pressure drop per unit length was compared for (a) the 6-turn configurations and (b) the 3-turn configurations.

As can be seen in FIG. 7*a* the pressure drop in the CFI and the CFR were very similar to that of a straight coil when re-directing the coiling after two turns.

In the 3-turn configuration (FIG. 7*b*) with a reversal of coiling after every single turn a slight but visible increase in the pressure drop per unit length was observed for the CFR, particularly at very high Reynolds numbers (Re=3000), with a relative increase in pressure drop up to a maximum of 9% compared to that of the straight coil.

Summarizing, the present CFR and CFI, showed similar superior mixing efficiencies for low and moderate Re (10 Re 500).

At higher values of Re>500 the present CFR showed much more mixing than the straight coil and CFI, despite of a strongly reduced residence time.

Additionally, CFR showed a systematically improved heat transfer.

The present CFR provides an efficient mixing device in coil configuration with a simple design resulting in economically costs.

As shown by the results set out above with the CFR of the present invention comprising 3 to 6 turns and not more than 2 flow reversals very good mixing with only low pressure drop as well as improved heat transfer is obtained.

Thus, the present invention presents a novel structured and simple coiled configuration which involves very low flow modifications since redirecting the flow only 2 times results in an excellent performance with only negligible increase in pressure drop.

REFERENCE NUMBERS

1 straight helical coil (prior art)
2 turn
3 carrier member
4 coiled flow inverter (CFI)
5 arm
6 coiled flow reverser (CFR)
7 re-direction point
8 re-direction aid
9 coil axis
P coil pitch
d pipe (tube) diameter
D coil diameter,
n number of turns

REFERENCES CITED

Ref 1
F. Jiang, K. S. Drese, S. Hardt, M. Kupper, F. Schönfeld, Helical flows and chaotic mixing in curved micro-channels, AIChE J. 50 (9) (2004) 2297-2305.
Ref 2
L. Dong, Z. Shufen, Numerical and experimental investigation of the effect of geometrical parameters on the performance of a contraction-expansion helical mixer, Int. J. Chem. React. Eng. 12 (1) (2014) 465-475.
Ref 3
Y. Lasbet, B. Auvity, C. Castelain, H. Peerhossaini, Thermal and hydrodynamic performances of chaotic mini-channel: application to the fuel cell cooling, Heat Transfer Eng. 28 (8-9) (2007) 795-803.

Ref 4
A. Alam, K.-Y. Kim, Analysis of mixing in a curved micro-channel with rectangular grooves, Chem. Eng. J. 181 (2012) 708-716.
Ref 5
M. Mansour, Z. Liu G. Janiga, K. D. P. Nigam, K. Sundmacher, D. Thévenin, K. Zähringer, Numerical study of liquid-liquid mixing in helical pipes, Chem. Eng. Sci. 172 (2017) 250-261.
Ref 6
M. Mansour, G. Janiga, K. D. P. Nigam, D. Theévnin, K. Zähringer, Numerical study of heat transfer and thermal homogenization in a helical reactor, Chem. Eng. Si. 177 (2018) 369-379.

The invention claimed is:

1. A tubular mixing device (6) with a helical configuration of a coil,
the coil having a coil pitch p,
wherein the coil pitch p is an incline of one complete turn (2) measured parallel to an axis of the coil,
wherein a first coiling direction is reverted to a second opposite coiling direction after a number n of full turns (2) with n=1 or 2 at a re-direction point (7) and,
wherein the axis (9) of the coil is straight.

2. The tubular mixing device (6) according to claim 1, further comprising a carrier member (3) onto which the coiled configuration is wound.

3. The tubular mixing device (6) according to claim 2, comprising at least one re-direction aid (8) arranged at said re-direction point (7).

4. The tubular mixing device (6) according to claim 2, wherein the fluids to be mixed are fed to the mixing device (6) with a parallel orientation of the fluids interface with respect to the coil axis (9) at the inlet surface of the mixing device (6).

5. The tubular mixing device (6) according to claim 4, wherein the fluid is a liquid.

6. Use of a tubular mixing device (6) according to claim 2 for mixing of fluids in a laminar flow regime with 10≤Re≤3000.

7. The tubular mixing device (6) according to claim 1, comprising at least one re-direction aid (8) arranged at said re-direction point (7).

8. The tubular mixing device (6) according to claim 7, wherein two or more re-direction aids (8) are arranged onto the surface of the carrier member (3) along a vertical line extending in parallel to the coil axis (9).

9. The tubular mixing device (6) according to claim 5, wherein the fluids to be mixed are fed to the mixing device (6) with a parallel orientation of the fluids interface with respect to the coil axis (9) at the inlet surface of the mixing device (6).

10. The tubular mixing device (6) according to claim 9, wherein the fluid is a liquid.

11. Use of a tubular mixing device (6) according to claim 7 for mixing of fluids in a laminar flow regime with 10≤Re≤3000.

12. The tubular mixing device (6) according to claim 1, wherein the fluids to be mixed are fed to the mixing device (6) with a parallel orientation of the fluids interface with respect to the coil axis (9) at the inlet surface of the mixing device (6).

13. The tubular mixing device (6) according to claim 12, wherein the fluid is a liquid.

14. Use of a tubular mixing device (6) according to claim 12 for mixing of fluids in a laminar flow regime with 10≤Re≤3000.

15. Use of a tubular mixing device (6) according to claim 1 for mixing of fluids in a laminar flow regime with 10≤Re≤3000.

16. Use of a mixing device according to claim 15 for mixing of fluids in a laminar flow regime with Re≥500.

17. Use of a mixing device according to claim 15 for heat transfer applications.

* * * * *